(12) United States Patent
Hobbs et al.

(10) Patent No.: US 8,594,137 B2
(45) Date of Patent: Nov. 26, 2013

(54) APPARATUS AND METHODS FOR IMAGE DECODING

(75) Inventors: David Victor Hobbs, Surrey (CA); Patrick Ratto, Burnaby (CA); Debra Dorey, legal representative, Burnaby (CA)

(73) Assignee: Teradici Corporation, Burnaby (GB)

( * ) Notice: Subject to any disclaimer, the term of this patent is extended or adjusted under 35 U.S.C. 154(b) by 1367 days.

(21) Appl. No.: 12/011,631

(22) Filed: Jan. 28, 2008

(65) Prior Publication Data

US 2008/0198270 A1      Aug. 21, 2008

Related U.S. Application Data

(60) Provisional application No. 60/890,797, filed on Feb. 20, 2007.

(51) Int. Cl.
*H04J 3/00* (2006.01)
(52) U.S. Cl.
USPC ...................................... 370/521; 375/240.03
(58) Field of Classification Search
USPC ........................ 375/240.02, 240.03, 240.11, 375/240.12–240.16, 240, 18, 240.19, 240.2, 375/240.22, 240.23; 370/464–546
See application file for complete search history.

(56) References Cited

U.S. PATENT DOCUMENTS

| | | | |
|---|---|---|---|
| 6,208,689 B1 | 3/2001 | Ohira et al. | |
| 7,062,096 B2 * | 6/2006 | Lin et al. | 382/232 |
| 7,106,908 B2 | 9/2006 | Ridge | |
| 7,555,042 B2 * | 6/2009 | Kim et al. | 375/240.12 |
| 7,706,445 B2 * | 4/2010 | Okada | 375/240.15 |
| 7,903,743 B2 * | 3/2011 | Ho | 375/240.25 |
| 2002/0159632 A1 | 10/2002 | Chui et al. | |

(Continued)

FOREIGN PATENT DOCUMENTS

| | | |
|---|---|---|
| EP | 0738070 | 10/1996 |
| WO | WO 2004/077833 A1 | 9/2004 |
| WO | WO 2004/077833 A2 * | 9/2004 |

OTHER PUBLICATIONS

Le Cun, Yann et al., "DjVu Document Browsing with On-Demand loading and rendering of image components," *Proceedings of SPIE's Internet Imaging II*, San Jose, CA, Feb. 2001.

(Continued)

*Primary Examiner* — Kwang B Yao
*Assistant Examiner* — Juvena Loo
(74) *Attorney, Agent, or Firm* — Moser Taboada

(57) ABSTRACT

A partially-built image stored in a buffer (such as for output to a display device) is combined by an image decoder with an encoded image update. The image is in a different format than the encoded image update (such as by being in a spatial domain, whereas the encoded image update is in a frequency domain). The image decoder operates, at least in part, by encoding the image to attain a same format as the encoded image update, combining the encoded image and the encoded image update, and decoding the result for storage in the buffer as an updated version of the image. The encoded image update is part of a progressive encoding. The encoding and/or the decoding are optionally lossy. After the image reaches a predetermined quality threshold, such as a perceptually lossless quality threshold, residual encoding/decoding techniques are optionally used for image updates.

23 Claims, 5 Drawing Sheets

(56) References Cited

U.S. PATENT DOCUMENTS

| | | |
|---|---|---|
| 2003/0031370 A1 | 2/2003 | Andrew |
| 2005/0062755 A1* | 3/2005 | Van Dyke et al. ............ 345/603 |
| 2005/0129123 A1* | 6/2005 | Xu et al. ................. 375/240.16 |
| 2005/0176436 A1 | 8/2005 | Mantravadi et al. |
| 2006/0109901 A1* | 5/2006 | Ye et al. ................. 375/240.08 |
| 2007/0229533 A1* | 10/2007 | Dalal et al. .................... 345/604 |
| 2008/0037656 A1* | 2/2008 | Hannuksela ............. 375/240.26 |
| 2009/0238264 A1* | 9/2009 | Wittig et al. ............. 375/240.03 |

OTHER PUBLICATIONS

International Preliminary Report on Patentability mailed Sep. 3, 2009 for PCT Application No. PCT/CA2008/000306.

European Communication/Supplementary European Search Report dated Mar. 3, 2011 for EP Application No. 08714629.6-2223/2126844 PCT/CA2008000306, 10 pages.

"Efficient FGS to Single Layer Transcoding", Yao-Chung Lin, et al., IEEE Transactions on Consumer Electronics, IEEE Service Center, New York, NY, US, Jun. 18, 2002, 2 pages.

* cited by examiner

APPARATUS AND METHODS FOR IMAGE DECODING

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. Provisional Application No. 60/890,797, filed Feb. 20, 2007, first named inventor David Victor Hobbs, and entitled APPARATUS AND METHODS FOR PROGRESSIVE IMAGE DECODING;

U.S. Non-Provisional application Ser. No. 11/532,865, filed Sep. 18, 2006, first named inventor David Victor Hobbs, and entitled METHODS AND APPARATUS FOR ENCODING A DIGITAL VIDEO SIGNAL;

U.S. Non-Provisional application Ser. No. 11/624,166, filed Jan. 17, 2007, first named inventor Patrick Ratto, and entitled METHODS AND APPARATUS FOR ENCODING A MASKED IMAGE; and U.S. Non-Provisional application Ser. No. 11/771,797, filed Jun. 29, 2007, first named inventor David Victor Hobbs, and entitled GROUP ENCODING OF WAVELET PRECISION.

BACKGROUND

1. Field

Advancements in image decoding are needed to provide improvements in one or more of performance, power utilization, cost, scalability, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

An image processing system includes an image encoder to encode an image to be transmitted and/or stored, and an image decoder to decode the image after reception of a transmission and/or retrieval from storage. The image decoder stores the decoded image, such as in a frame buffer, in a format compatible with a display device. The frame buffer is repeatedly read to refresh the display device. In some image processing systems, a stream of images is encoded and transmitted (or stored), and the image decoder repeatedly updates the frame buffer as the encoded stream of images is decoded so that the display device displays the stream of decoded images. In further image processing systems, such as MPEG systems, some images of the stream of images are sent in a residually encoded format as a difference from a previous image, rather than as a separate image.

Some image encoders, such as JPEG2000 encoders, use a progressive image encoding where an image in a spatial domain is transformed to a frequency domain, such as by a Discrete Cosign Transform (DCT), and then is provided to an image decoder as a series of progressively encoded image updates, each update providing more resolution (for example, higher frequencies in the frequency domain), than the previous. A progressive image decoder is enabled to receive the progress image updates, to quickly display a rough version of the image based on early ones of the progressively encoded image updates, and to build up and display more accurate versions of the image as further ones of the progressively encoded image updates are received. To receive and to process the progressively encoded image updates, some progressive image decoders store both a frequency-encoded version of the image to which the progressively encoded image updates are applied, and a spatially-encoded version of the image in a frame buffer for output to a display device.

REFERENCES

Additional information regarding video compression may be found in: "H.264 and MPEG-4 Video Compression: Video Coding for Next Generation Multimedia", Iain Richardson, Aug. 12, 2003, John Wiley and Sons, Inc., ISBN 978-0470848371.

Additional information regarding GREWP encoding may be found in: U.S. patent application Ser. No. 11/771,797 which is owned by the owner of this instant application.

All of the aforementioned references are herein incorporated by reference for all purposes.

SYNOPSIS

The invention may be implemented in numerous ways, including as a process, an article of manufacture, an apparatus, a system, and as a set of computer-readable descriptions and/or instructions embedded on and/or in a computer-readable medium such as a computer-readable storage medium or a computer network wherein computer-executable instructions are sent over optical or electronic communications links. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. The Introduction includes Example Combinations of one or more of systems, methods, articles of manufacture, and computer-readable media in accordance with the concepts described herein. As is discussed in more detail in the Conclusions, the invention encompasses all possible modifications and variations within the scope of the issued claims.

DETAILED DESCRIPTION

Figure 1:
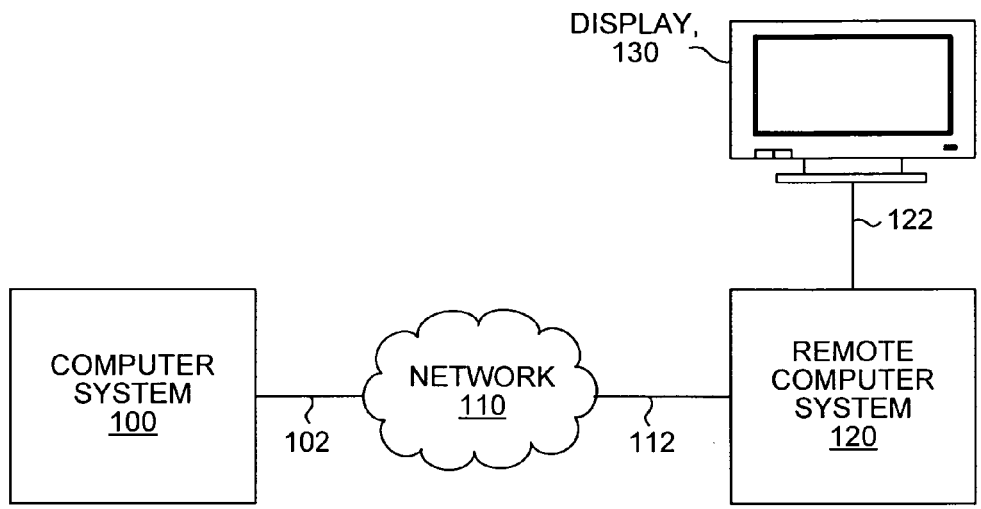
FIG. 1 illustrates selected details of an embodiment of a system enabled to encode, transmit, decode, and display one or more images using image encoding techniques.

A detailed description of one or more embodiments of the invention is provided below along with accompanying figures illustrating selected details of the invention. The invention is described in connection with the embodiments. It is well established that it is neither necessary nor practical to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or computer-executable instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms and Terms

Elsewhere herein various shorthand abbreviations, or acronyms, are used to refer to certain elements. The descriptions of at least some of the acronyms follow.

| Acronym | Description |
| --- | --- |
| AMBA ® | Advanced Microprocessor Bus Architecture |
| ASIC | Application-Specific Integrated Circuit |
| CPU | Central Processing Unit |
| DCT | Discrete Cosine Transform |
| DRAM | Dynamic Random Access Memory |
| DWT | Discrete Wavelet Transform |
| FPGA | Field Programmable Gate Array |
| HID | Human Interface Device |
| ICT | Irreversible Color Transform |
| PROM | Programmable Read-Only Memory |
| RAM | Random Access Memory |
| RGB | Red Green Blue color encoding fomrat |
| ROM | Read-Only Memory |
| SATA | Serial Advanced Technology Attachment |
| SCSI | Small Computer System Interface |
| SRAM | Static Random Access Memory |
| TMDS | Transition-Minimized Differential Signaling |
| USB | Universal Serial Bus |
| YUV | Y (luminance) and U/V (chrominance) color encoding format |

The term processor as used herein refers to any type of processor, CPU, microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

The term YUV color format as used herein refers to any of various color encoding formats, such as YCbCr, YPbPr, YIQ, and other similar formats having luminance and/or chrominance components. In one type of YUV color format, Y represents the luminance component, and U and V are the color (chrominance) components. Conversion between color formats, such as between a YUV color format and an RGB color format, generally involves computing the components (values) of the desired color format from the components (values) of the given color format, such as with a set of color mapping equations. The conversion can be reversible (meaning that no information is lost in the conversion), or irreversible (such as when the desired color format has less precision than the given color format). While the examples herein use YUV color format and RGB color format, techniques described herein are not limited to solely these two color formats, and the techniques work with many different color formats.

Overview

This Overview section provides an overview of one set of embodiments. Details of some other embodiments are described in subsequent sections.

A partially-built image stored in a buffer (such as for output to a display device) is combined by an image decoder with an encoded image update. The image is in a different format than the encoded image update (such as by being in a spatial domain, whereas the encoded image update is in a frequency domain). The image decoder operates, at least in part, by encoding the image to attain a same format as the encoded image update, combining the encoded image and the encoded image update, and decoding the result for storage in the buffer as an updated version of the image. The encoded image update is part of a progressive encoding. The encoding and/or the decoding are optionally lossy. After the image reaches a predetermined quality threshold, such as a perceptually lossless quality threshold, residual encoding/decoding techniques are optionally used for image updates.

An image stored on and/or created on a host computer system (such as computer system 100 of FIG. 1) is transmitted to a remote computer system (such as remote computer system 120 of FIG. 1) for output such as to a display (such as display 130 of FIG. 1). According to various embodiments, the image is one or more of: a frame of an image stream, such as a video stream; a portion of a larger image, such as a bounded region of the larger image; a layer of a more complex image, such as a layer based on spatial and/or temporal features of the more complex image, the features including contrast, color, content, and/or other suitable parameters; a layer of a more complex image, such as a video layer, a text layer or a background layer; and any combination of the foregoing. The computer system encodes the image for transmission (producing an encoded image), and the remote computer system decodes the encoded image (producing a decoded image) for the output. In various embodiments, the decoded image is stored in a buffer, such as a frame buffer. In further embodiments, the decoded image is stored in a stored format different than that of an output format, and the output includes converting from the stored format to the output format. For example, in some embodiments, the stored format uses a YUV color format, and the output format uses an RGB color format.

In some embodiments, the encoding is a progressive image encoding, and the remote computer system includes a progressive image decoder. In various embodiments, the encoding transforms the image, such as via a Discrete Wavelet Transform (DWT) or Discrete Cosine Transform (DCT), and transmits the encoded image as a series of progressively encoded updates (also called a progressively encoded image stream), each of the progressively encoded updates configured to increase accuracy of the decoded image. For example, in some embodiments, an initial one of the progressively encoded updates includes the highest-order (most significant) portions of transformed coefficients of the encoded image, and subsequent ones of the progressively encoded updates include lower-order (less significant) portions of the transformed coefficients. By sending the image in this manner, the remote computer system is enabled to display a lower-resolution (less accurate) version of the decoded image after decoding the initial progressively encoded update, and is enabled to refine (increase the accuracy of) the decoded image using the subsequent progressively encoded updates.

Continuing the example, after the computer system has transmitted a sufficient number of the progressively encoded updates such that the decoded image has reached a predetermined quality threshold, such as a perceptually lossless quality threshold, the computer system is configured to transmit further updates to the image in an alternative encoding, such as a residual encoding, and the remote computer system is configured to decode the alternative encoding to update the image. In some embodiments and/or usage scenarios, sending a final update to the image using the alternative encoding uses less bandwidth and/or other resources than continuing to send a remainder of the series of progressively encoded updates. In various embodiments and/or usage scenarios, using the alternative encoding requires fewer resources, such as bandwidth, if the image is changing slowly. According to various embodiments, the alternative encoding includes one or more of: frequency domain residual encoding; spatial domain residual encoding; bit-plane, sub-sampled spatial domain residual encoding; pixel, sub-sampled spatial domain residual encoding; any other residual encoding techniques; any of various entropy encodings; and any combination of the foregoing.

In some embodiments, the progressive image decoder is configured to re-encode the decoded image to produce a re-encoded image, combine the re-encoded image with a non-initial one of the progressively encoded updates to produce a combined image, decode the combined image to update the decoded image, and iterate the foregoing for subsequent ones of the progressively encoded updates. In further embodiments, the progressive image decoder is enabled to decode an initial one of the progressively encoded updates to produce an initial version of the decoded image. In various embodiments, the re-encoding enables the remote computer system to store the decoded image and to not retain ones of the progressively encoded updates after the ones of the progressively encoded updates have been used to produce the combined image.

In some embodiments, a respective build state is associated with each of the progressively encoded updates. In further embodiments, a decoded image build state is associated with the decoded image, and the decoded image build state corresponds to the build state associated with the one of the progressively encoded updates most recently combined and/or decoded to produce the decoded image. According to various embodiments, the build state includes one or more of: information indicating a quantization, such as a precision, of the portions of the transformed coefficients in the respective progressively encoded update; information indicating a portion, such as a region and/or a layer, of a larger image of which the respective progressively encoded update is a part; information indicating masking of the image; and other information related to the image. In some embodiments, the decoded image build state and/or the build state associated with a particular one of the progressively encoded updates determines, at least in part, operation of the progressive image decoder. For example, in some embodiments, the decoded image build state determines a quantization of the re-encoded image.

In some embodiments, subsequent ones of the series of progressively encoded updates are associated with different portions of the image. For example, an initial one of the series of progressively encoded updates provides an initial, less accurate, version of the image, and subsequent ones of the series of progressively encoded updates provide greater accuracy for respective portions less than all of the image. Continuing the example, the respective build state associated with each of the progressively encoded updates indicates the respective portion of the image to which the progressively encoded update is applied. In this manner, a rapidly changing or more detailed portion of the image is enabled to be updated prior to a slowly changing or less detailed portion of the image.

In some embodiments, a lossy representation of an image at an image decoder is re-encoded to produce transform domain coefficients. The transform domain coefficients are combined with, such as by being added to, coefficients (such as partial coefficients of a known precision) associated with a next build state, to produce updated transform domain coefficients. The updated transform domain coefficients correspond, for example, to an improved quality representation of the image. The updated transform domain coefficients are then decoded and output, such as to a display.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method including:
 re-encoding at least a portion of a previously-built image to produce a re-encoded image portion;
 combining the re-encoded image portion with a progressively encoded update of the at least a portion of the previously-built image to produce a combined encoded image portion;
 decoding the combined encoded image portion to produce a display image portion; and
 outputting the display image portion to a display device.

EC2) The method of EC1,
 where the progressively encoded update is a subsequent progressively encoded update; and
 further including decoding an initial progressively encoded update to produce the at least a portion of the previously-built image.

EC3) The method of EC2,
 where the initial progressively encoded update corresponds to an initial build state; and
 where the subsequent progressively encoded update corresponds to a subsequent build state.

EC4) The method of EC3, further including receiving the initial build state and the subsequent build state from a computer system.

EC5) The method of EC4, further including receiving the progressively encoded update from the computer system.

EC6) The method of EC2, where the at least a portion of the previously-built image, the re-encoding, the combining, and the decoding have sufficient precision to produce a bit exact match to a single decoding of a combination of the initial progressively encoded update and the subsequent progressively encoded update.

EC7) The method of EC2, where the initial progressively encoded update is discarded prior to the combining the re-encoded image portion with the subsequent progressively encoded update.

EC8) The method of EC2, where the precision of the at least a portion of the previously-built image is sufficient such that the re-encoded image portion includes the initial progressively encoded update.

EC9) The method of EC1,
 where the combined encoded image portion is a subsequent combined encoded image portion; and
 further including decoding a prior combined encoded image portion to produce the at least a portion of the previously-built image.

EC10) The method of EC1, where the re-encoding the at least a portion of the previously-built image includes transforming the at least a portion of the previously-built image, and scaling and quantizing a result of the transforming.

EC11) The method of EC10, where the transforming uses a frequency domain transform.

EC12) The method of EC10, where the scaling and the quantizing includes rounding.

EC13) The method of EC12, where the scaling and quantizing includes rounding down.

EC14) The method of EC10, where the quantizing is according to build state associated with the at least a portion of the previously-built image.

EC15) The method of EC1, where the re-encoding is an inverse operation of the decoding.

EC16) The method of EC1, where the progressively encoded update includes at least a part of a progressive encoding of at least a portion of a particular image.

EC17) The method of EC16, where the at least a portion of the previously-built image is a quantized version of the at least a portion of the particular image.

EC18) The method of EC16, further including updating the at least a portion of the previously-built image using the display image portion.

EC19) The method of EC18, where the updating includes replacing.

EC20) The method of EC18, where the updating includes over-writing.

EC21) The method of EC18, further including repeating the re-encoding, the combining, the decoding, and the updating with subsequent parts of the progressive encoding of the at least a portion of the particular image.

EC22) The method of EC21, where the repeating increases the accuracy of the at least a portion of the previously-built image.

EC23) The method of EC21, further including terminating the repeating when the at least a portion of the previously-built image reaches a perceptually lossless quality threshold.

EC24) The method of EC23, where the at least a portion of the previously-built image is a perceptually lossless version of the at least a portion of the particular image when the perceptually lossless quality threshold is reached.

EC25) The method of EC23, further including, subsequent to the terminating, receiving one or more residually-encoded updates to the at least a portion of the previously-built image.

EC26) The method of EC25, further including, processing a particular one of the residually-encoded updates to residually update the at least a portion of the previously-built image.

EC27) The method of EC26, where the processing the particular residually-encoded update includes:
 color space converting the at least a portion of the previously-built image to produce a converted at least a portion of the previously-built image;
 combining the converted at least a portion of the previously-built image with the particular residually-encoded update to produce a combined converted at least a portion of the previously-built image; and
 using the combined converted at least a portion of the previously-built image as a new version of the at least a portion of the previously-built image.

EC28) The method of EC16, where the at least a portion of the particular image is at least a portion of a layer of the particular image.

EC29) The method of EC28, where the at least a portion of the particular image is a layer of the particular image.

EC30) The method of EC16, where the at least a portion of the particular image is a region of the particular image.

EC31) The method of EC16, where the at least a portion of the particular image is all of the particular image.

EC32) The method of EC1, where the re-encoded image portion is a quantized transform of at least a portion of a particular image.

EC33) The method of EC32, where the transform is a two-dimensional transform.

EC34) The method of EC32, where the transform is a reversible transform.

EC35) The method of EC32, where the transform uses a Discrete Cosine Transform (DCT) or a Discrete Wavelet Transform (DWT).

EC36) The method of EC32, where the progressively encoded update includes at least a part of a progressive encoding of the at least a portion of the particular image.

EC37) The method of EC36, further including:
receiving an initial portion of the progressive encoding; and
decoding the initial portion of the progressive encoding to produce a decoded initial portion of the progressive encoding; and
storing the decoded initial portion of the progressive encoding as the at least a portion of the previously-built image.

EC38) The method of EC32, where the re-encoded image portion includes same data values, given a current quantization, as obtained by encoding the at least a portion of the particular image.

EC39) The method of EC38, where the re-encoded image portion includes same data values as obtained by encoding the at least a portion of the particular image.

EC40) The method of EC1, further including receiving updates to the display image portion in a residually-encoded format.

EC41) The method of EC1, where the progressively encoded update includes transformed image coefficients.

EC42) The method of EC41, where the transformed image coefficients are of a progressively encoded image.

EC43) The method of EC1, where the combining includes using the progressively encoded update to increase accuracy of the re-encoded image portion.

EC44) The method of EC1, further including receiving the progressively encoded update in an encoded format.

EC45) The method of EC44, where the encoded format uses a Discrete Cosine Transform encoding or a Discrete Wavelet Transform encoding.

EC46) The method of EC1, where the re-encoding is a frequency domain encoding.

EC47) The method of EC46, where the re-encoding is a transformation from a spatial domain representation to a frequency domain representation.

EC48) The method of EC46, where the re-encoding uses one or more of a Discrete Cosine Transform (DCT) encoding and wavelet encoding.

EC49) The method of EC1, further including, in response to the progressively encoded-update including new image data, forcing the combined encoded image portion to be the progressively encoded update.

EC50) The method of EC49, where the forcing the combined encoded image portion to be the progressively encoded update includes forcing the re-encoded image portion to zero.

EC51) The method of EC1, further including, in response to build state associated with the progressively encoded update indicating an initial build state, forcing the combined encoded image portion to be the progressively encoded update.

EC52) The method of EC51, where the forcing the combined encoded image portion to be the progressively encoded update includes forcing the re-encoded image portion to zero.

EC53) The method of EC52, where the forcing the re-encoded image portion to zero is via setting a quantization factor of the re-encoding.

EC54) The method of EC51, further including receiving the build state from a computer system.

EC55) The method of EC54, further including receiving the progressively encoded update from the computer system.

EC56) The method of EC54, where the computer system is a host computer system.

EC57) The method of EC1, further including storing the display image portion as at least a portion of a display image.

EC58) The method of EC57, where the at least a portion of the display image is a next version of the at least a portion of the previously-built image.

EC59) The method of EC57, where the display image is a next version of the previously-built image.

EC60) The method of EC57, further including repeating the re-encoding, the combining, the decoding, and the storing for subsequent progressively encoded updates.

EC61) The method of EC57, further including outputting the display image to the display device.

EC62) The method of EC61, further including repeatedly performing the outputting the display image.

EC63) The method of EC57, where the display image is a full screen image.

EC64) The method of EC57, where the display image is a region of a full screen image.

EC65) The method of EC1, where the outputting includes color space conversion.

EC66) The method of EC65, where the color space conversion converts to an RGB color format.

EC67) The method of EC65, where the color space conversion converts from a YUV color format.

EC68) The method of EC65, where precision of the display image portion is greater than precision of the outputting to the display device.

EC69) The method of EC68, where precision of the display image portion is greater than precision of output to the display device, due, at least in part, to the color space conversion.

EC70) The method of EC1, where the decoding includes a color space transform.

EC71) The method of EC70, where the color space transform is a reversible color space transform.

EC72) The method of EC70, where the encoding includes an inverse color space transform.

EC73) The method of EC1, further including storing the display image portion in a buffer as a stored display image portion.

EC74) The method of EC73, where the buffer is a frame buffer.

EC75) The method of EC73, where the buffer is partitioned.

EC76) The method of EC73, where the storing is in a spatial domain using a YUV color format.

EC77) The method of EC76, where a precision of the outputting is less than a precision of the storing.

EC78) The method of EC77, where the outputting is in a spatial domain using an RGB color format.

EC79) The method of EC73, further including reading the at least a portion of the previously-built image from the buffer.

EC80) The method of EC73, further including receiving a residually encoded update to the stored display image portion.

EC81) The method of EC80, further including updating the stored display image portion using the residually encoded update.

EC82) The method of EC81, where the updating the stored display image portion includes color space converting the stored display image portion to produce a color space converted display image portion, and adding the color space converted display image portion to the residually encoded update to produce a color space converted lossless display image portion.

EC83) The method of EC82, where the updating the stored display image portion further includes inverse color space converting the color space converted lossless display image portion to produce a lossless display image portion, and using the lossless display image portion as a next version of the stored display image portion.

EC84) The method of EC1, further including reading the at least a portion of the previously-built image.

EC85) The method of EC84, where the reading is from a buffer.

EC86) The method of EC85, where the buffer is a frame buffer.

EC87) A computer-readable medium having a set of instructions stored therein which when executed by a processing device causes the processing device to perform procedures including:
- re-encoding at least a portion of a previously-built image to produce a re-encoded image portion;
- combining the re-encoded image portion with a progressively encoded update of the at least a portion of the previously-built image to produce a combined encoded image portion;
- decoding the combined encoded image portion to produce a display image portion; and
- storing the display image portion to a buffer as a stored display image portion, the stored display image portion enabled to be output to a display device.

EC88) The computer-readable medium of EC87, where the computer-readable medium is enabled to be executed by a processing device including one or more processors.

EC89) The computer-readable medium of EC87, where the computer-readable medium is enabled to be executed by a processing device including a hardware re-encoder to perform, at least in part, the re-encoding.

EC90) The computer-readable medium of EC89, where the processing device includes at least one processor.

EC91) The computer-readable medium of EC87, where the buffer is a frame buffer.

EC92) The computer-readable medium of EC87, where the procedures further include updating the at least a portion of the previously-built image with the display image portion.

EC93) A method including:
- transforming at least a portion of a stored image to produce a transformed image;
- combining the transformed image with received data to produce combined data;
- inverse transforming the combined data to produce an update of the at least a portion of the stored image; and
- outputting an updated version of the at least a portion of the stored image to a display device.

EC94) The method of EC93, where the update of the at least a portion of the stored image replaces the at least a portion of the stored image.

EC95) The method of EC93,
where the received data is first received data; and
further including inverse transforming second received data to produce the at least a portion of the stored image.

EC96) The method of EC95, where the at least a portion of the stored image, the transforming, the combining, and the inverse transforming the combined data have sufficient precision to produce a bit exact match to a single inverse transform of a combination of the first received data and the second received data.

EC97) The method of EC95, where the second received data is discarded prior to the combining the transformed image with the first received data.

EC98) The method of EC97, further including:
- transforming the updated version of the at least a portion of the stored image to produce a transformed updated image;
- combining the transformed updated image with third received data to produce combined updated data; and
- where the first received data is discarded prior to the combining the transformed updated image with the third received data.

EC99) The method of EC98, further including inverse transforming the combined updated data to produce a next update of the at least a portion of the stored image.

EC100) The method of EC95, where precision of the at least a portion of the stored image is sufficient such that the transformed image includes the second received data.

EC101) The method of EC93, further including updating the at least a portion of the stored image using, at least in part, the update of the at least a portion of the stored image, to produce the updated version of the at least a portion of the stored image.

EC102) The method of EC93, where the outputting includes converting a color space of the updated version of the at least a portion of the stored image.

EC103) The method of EC93, where the transforming includes a Discrete Cosine Transform (DCT) or a wavelet encoding.

EC104) A method including:
- re-encoding at least a portion of a previously-built image to produce a re-encoded image portion;
- combining the re-encoded image portion with a progressively encoded update to the at least a portion of the previously-built image to produce a combined encoded image portion;
- decoding the combined encoded image portion to produce a display image portion;
- storing the display image portion to update the at least a portion of the previously-built image; and
- outputting the updated previously-built image to a display device.

EC105) The method of EC104, where the progressively encoded update uses a frequency domain encoding.

EC106) The method of EC105, where the frequency domain encoding uses a Discrete Cosine Transform (DCT) or a wavelet encoding.

EC107) The method of EC104, where the at least a portion of the previously-built image is a layer of the previously-built image.

EC108) The method of EC104, where the at least a portion of the previously-built image is a region of the previously-built image.

EC109) The method of EC104, where the at least a portion of the previously-built image is all of the previously-built image.

EC110) The method of EC104, where the storing is to a buffer.

EC111) The method of EC110, where the buffer is a frame buffer.

EC112) The method of EC104, where the storing is in a spatial domain using a YUV color format.

EC113) The method of EC104, where the outputting is at a lower level of precision than the storing.

EC114) The method of EC113, where the outputting is in a spatial domain using an RGB color format.

EC115) The method of EC104, further including repeating the outputting.

EC116) The method of EC104, where the outputting includes color space conversion.

EC117) A progressive image decoder including:
- an input enabled to receive one or more progressively encoded updates of an image;

a buffer configured to store a display image, and enabled to output the display image;

circuitry enabled to combine at least a portion of the display image with one of the progressively encoded updates of the image to produce an updated at least a portion of the display image; and where the buffer is further configured to store the updated at least a portion of the display image as a new version of the at least a portion of the display image.

EC118) The progressive image decoder of EC117, where the display image is in a spatial domain, and the progressively encoded updates of the image are in a transform domain.

EC119) The progressive image decoder of EC118, where the buffer is a frame buffer.

EC120) The progressive image decoder of EC118, where a first one of the progressively encoded updates is enabled to be discarded prior to a second one of the progressively encoded updates being combined by the circuitry enabled to combine.

EC121) The progressive image decoder of EC118, where each of the progressively encoded updates is enabled to be used by the circuitry enabled to combine as the each progressively encoded update is received.

EC122) The progressive image decoder of EC121, where the progressively encoded updates are not stored by the progressive image decoder.

EC123) The progressive image decoder of EC118, where the progressively encoded updates are used by the circuitry enabled to combine as the progressively encoded updates are received, and the progressively encoded updates are not otherwise retained by the progressive image decoder.

EC124) The progressive image decoder of EC118, where the progressive image decoder stores the image solely as the display image.

EC125) The progressive image decoder of EC118, where the buffer is further configured to provide the at least a portion of the display image to the circuitry enabled to combine.

EC126) The progressive image decoder of EC118, where the display image is in a spatial domain.

EC127) The progressive image decoder of EC118, where the progressively encoded updates are in a frequency domain.

EC128) The progressive image decoder of EC127, where the circuitry enabled to combine includes an encoder configured to encode the at least a portion of the display image.

EC129) The progressive image decoder of EC128, where the encoder is configured to encode into the frequency domain.

EC130) The progressive image decoder of EC118, where the circuitry enabled to combine includes an encoder configured to encode the at least a portion of the display image.

EC131) The progressive image decoder of EC130, where the circuitry enabled to combine includes a decoder configured to decode a combination of results of the encoder and the one of the progressively encoded updates.

EC132) The progressive image decoder of EC131, where the decoder produces the updated at least a portion of the display image.

EC133) The progressive image decoder of EC131, where the circuitry enabled to combine includes a processor.

EC134) The progressive image decoder of EC133, where the processor is configured to perform, at least in part, the decoding.

EC135) The progressive image decoder of EC118, where the buffer is enabled to output the display image to a display device.

EC136) The progressive image decoder of EC118, where the circuitry enabled to combine includes a processor.

EC137) An image decoder including:

image storage configured to store an image encoded in a spatial domain, and enabled to provide the image to an output;

frequency domain encoding circuitry to transform at least a portion of contents of the image storage to a frequency domain;

combining circuitry to combine image update data with results of the frequency domain encoding circuitry; and decoding circuitry to transform results of the combining circuitry to the spatial domain and configured to store results in the image storage to update the image.

EC138) The image decoder of EC137, where the image update data includes a part of a progressive encoding of a source image.

EC139) The image decoder of EC137, where the image storage includes a frame buffer.

EC140) The image decoder of EC137, where the output is coupled to a display device.

EC141) A progressive image decoder including:

means for storing an image;

means for outputting the image;

means for receiving a progressively encoded image update;

means for combining the progressively encoded image update with contents of the means for storing; and where the means for combining includes an encoder, the encoder configured to transform at least a portion of the contents of the means for storing to a same format as the progressively encoded image update.

EC142) The progressive image decoder of EC141, where the means for combining further includes a decoder.

EC143) The progressive image decoder of EC142, where the decoder is configured to decode a combination of the progressively encoded image update with results of the encoder.

EC144) The progressive image decoder of EC142, where the means for storing includes means for updating, the means for updating configured to store results of the decoder as at least a portion of the image.

EC145) The progressive image decoder of EC141, where the means for storing includes a frame buffer.

EC146) The progressive image decoder of EC141, where the means for outputting the image is enabled to output the image to a display device.

EC147) The progressive image decoder of EC141, where the means for receiving includes a network interface.

EC148) A method including:

re-encoding at least a portion of a previously-built image to produce a re-encoded image portion;

combining the re-encoded image portion with a non-initial one of a plurality of progressively encoded updates of the at least a portion of the previously-built image to produce a combined encoded image portion;

decoding the combined encoded image portion to produce a display image portion; and outputting the display image portion to a display device.

EC149) The method of EC148, further including decoding an initial one of the progressively encoded updates to produce the at least a portion of the previously-built image.

EC150) The method of EC149, where the at least a portion of the previously-built image, the re-encoding, the combining, and the decoding have sufficient precision so that the outputting of the display image portion produces same pixel values as outputting a result of a single decoding of a combination of the initial progressively encoded update and the non-initial progressively encoded update.

EC151) The method of EC149, where the initial progressively encoded update is discarded prior to the combining the re-encoded image portion with the non-initial progressively encoded update.

EC152) The method of EC149, further including, in response to build state associated with the initial progressively encoded update indicating an initial build state, forcing the combined encoded image portion equal to the initial progressively encoded update.

EC153) The method of EC152, where the forcing includes setting a quantization factor of the re-encoding such that the re-encoded image portion is forced to zero.

EC154) The method of EC148,
where the combined encoded image portion is a subsequent combined encoded image portion; and
further including decoding a prior combined encoded image portion to produce the at least a portion of the previously-built image EC155) The method of EC148,
further including updating the at least a portion of the previously-built image using the display image portion; and
where the progressively encoded updates include at least an initial part of a progressive encoding of at least a portion of a particular image.

EC156) The method of EC155, where the re-encoded image portion is a quantized version of an encoding of the at least a portion of the particular image.

EC157) The method of EC155, further including repeating the re-encoding, the combining, the decoding, and the updating with subsequent parts of the progressive encoding of the at least a portion of the particular image.

EC158) The method of EC157, further including terminating the repeating when the at least a portion of the previously-built image reaches a predetermined quality threshold.

EC159) The method of EC158, further including, subsequent to the terminating, receiving one or more alternatively-encoded updates to the at least a portion of the previously-built image.

EC160) The method of EC159, where the alternatively-encoded updates include residually-encoded updates.

EC161) The method of EC159, further including updating the at least a portion of the previously-built image based on the alternatively-encoded updates.

EC162) The method of EC148,
where the non-initial progressively encoded update includes non-initial parts of transformed image coefficients; and
where the combining includes using the non-initial progressively encoded update to increase accuracy of the re-encoded image portion.

EC163) The method of EC148, where the re-encoding is a transformation from a spatial domain representation to a frequency domain representation.

EC164) The method of EC148, further including, receiving residually-encoded updates to the display image portion.

EC165) The method of EC148, where the outputting includes color space conversion.

EC166) The method of EC165, where the color space conversion converts from a YUV format.

EC167) The method of EC165, where precision of the display image portion is greater than precision of the outputting to the display device.

EC168) A computer-readable medium having a set of instructions stored therein which when executed by a processing device causes the processing device to perform procedures including:

transforming at least a portion of a stored image to produce a transformed image;
combining the transformed image with received data to produce combined data;
inverse transforming the combined data to produce a next version of the at least a portion of the stored image; and
storing the next version of the at least a portion of the stored image to a buffer, the stored image enabled to be output to a display device.

EC169) The computer-readable medium of EC168, where the procedures further include reading the at least a portion of the stored image from the buffer.

EC170) The computer-readable medium of EC168, where the computer-readable medium is enabled to be executed by a processing device including a hardware encoder, the hardware encoder configured to perform, at least in part, the transforming.

SYSTEM

FIG. 1 illustrates selected details of an embodiment of a system enabled to encode, transmit, decode, and display one or more images using image encoding and image decoding techniques. According to various embodiments, the one or more images are one or more of: a series of still images, such as photographic images; synthetic images; a stream of images, such as a video stream of a movie; video or composite images, such as a stream of computer display images optionally and/or selectively including photographs and/or video and/or text overlay; scrolling images, such as in a graphical word processing environment; other changing display information; a region and/or a layer of any of the foregoing; and any combination of the foregoing. In further embodiments, the encoding and the decoding use progressive build and/or progressive encoding/decoding techniques.

In some embodiments, a particular one of the images is decomposed into one or more image portions, such as regions and/or layers, of different image types. The image types include background, text, picture, video, or object layers based on one or more spatial and/or temporal features such as region (location in the particular image), contrast, color, content, and other suitable parameters. The layers, such as the picture layers or the video layers, are then independently processed using progressive encoding/decoding techniques. The progressive encoding/decoding techniques enable display of a less accurate version of each respective one of the layers prior to all of the respective layer being received. Accordingly, the display system is quickly responsive to changes in image content, even under constrained transmission (e.g., network) bandwidth. In various embodiments, high-detail aspects of an image or areas outside a region of interest of the image are transmitted at a lower priority and/or subject to transmission bandwidth constraints.

In some embodiments, an image is decomposed into different layers based on pixel update status, and the image is progressively encoded. In further embodiments, a pixel that has been processed, for example encoded and transmitted, is covered by a mask until it changes value to prevent retransmission of redundant information.

Figure 2:
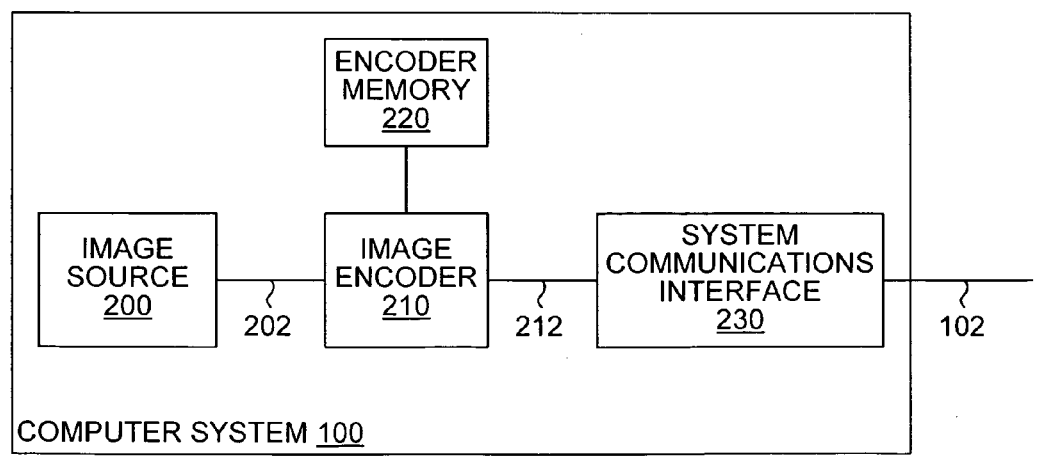
FIG. 2 illustrates selected details of an embodiment of a computer system enabled to use image encoding techniques to encode an image, and enabled to transmit the encoded image.
Figure 3:
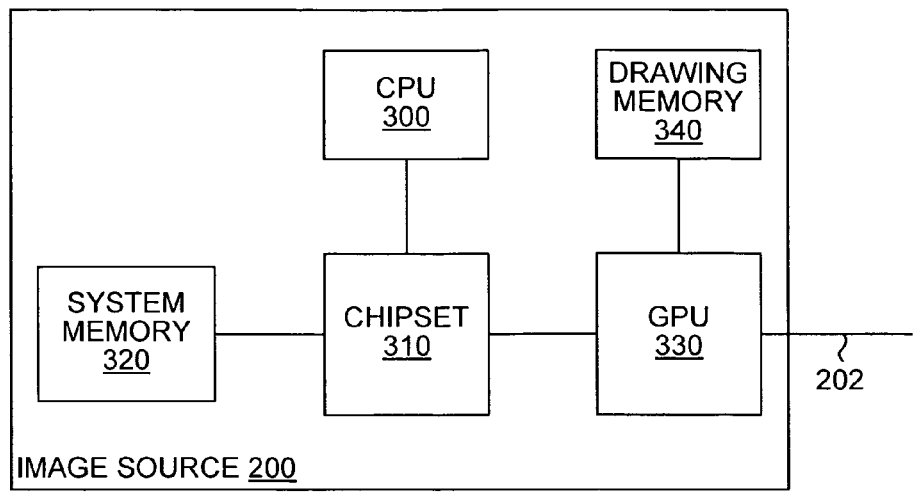
FIG. 3 illustrates selected details of an embodiment of an image source.

In some embodiments, computer system 100 includes an image source, such as image source 200 as illustrated in FIG. 3, and an image encoder, such as image encoder 210 as illustrated in FIG. 2. According to various embodiments, computer system 100 is one or more of: a client blade PC architecture; a computer server architecture; and any computer system or processor capable of performing image encoding techniques. The exemplary embodiment of computer system 100, as illustrated in FIGS. 1-3, is one of many possible embodiments. Various embodiments are contemplated, including various types of computer systems, processors, storage systems, and/or other hardware devices, along with programming and/or processing environments, providing progressive image and/or video encoding capabilities.

Computer system 100 is connected to network 110 by connection 102. Network 110 provides communications between various computer systems, including computer system 110 and remote computer system 120. According to various embodiments, network 110 includes one or more of: a wire-line network using Internet Protocol (IP) deployed as a local area network (LAN), such as may be used in a corporate environment; a wireless network; a Wide Area Network (WAN), such as may be used to connect an Internet Service Provider (ISP) to residential subscribers; and any other type of network or combination of networks enabling communication between computer systems and/or other electronic devices.

Remote computer system 120 is connected to network 110 by connection 112. Remote computer system 120 is coupled to display 130 by connection 122. According to various embodiments, connection 122 is one or more of: a Digital Visual Interface (DVI) connection; a Digital Packet Video Link (DPVL) connection; a Video Graphics Array (VGA) connection; a DisplayPort™ connection; any other suitable display connection; and any combination of the foregoing.

Figure 4:
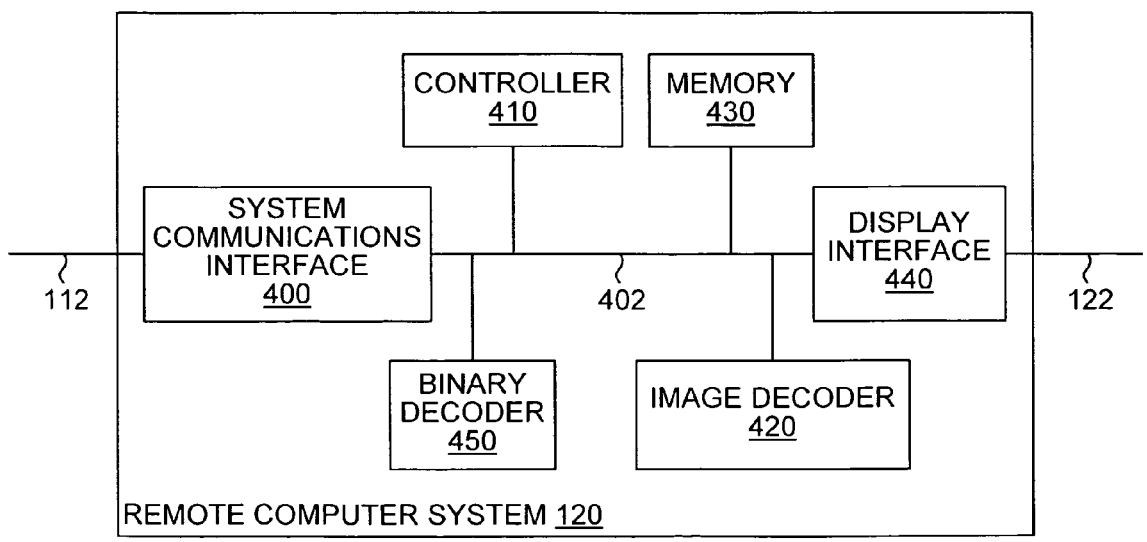
FIG. 4 illustrates selected details of an embodiment of a remote computer system enabled to receive an encoded image, and enabled to display a decoded version of the image.

In some embodiments, remote computer system 120 is configured as a remote desktop. In further embodiments, peripheral devices typical of a desktop computer, such as mouse, keyboard, and others not illustrated in FIG. 1, are also coupled to remote computer system 120. An exemplary embodiment of remote computer system 120 is illustrated in FIG. 4.

According to various embodiments, display 130 is one or more of: a Liquid Crystal Display (LCD) display; a Cathode Ray Tube (CRT) display; a plasma display; any other type of display capable of displaying the one or more images; and any combination of the foregoing. For example, in some embodiments where connection 122 is a DVI connection, display 130 is an SXGA display supporting a resolution of 1280×1024. In other examples, display 130 supports one or more of the VGA, HDTV, UXGA, QXGA, WXGA and WQXGA display standards.

In other embodiments, computer system 100 is communicatively coupled to a mass storage system, and encoded image information generated by the image encoding techniques is transmitted to storage of the mass storage system, such as by being sent to the mass storage system via network 110, or such as by being stored on mass storage directly coupled to computer system 100. In further embodiments, computer system 100 or another computer system, such as remote computer system 120, retrieves the encoded image information from the mass storage system and performs the decoding. The techniques described herein are applicable in various embodiments, including those where progressive image decoding is performed.

FIG. 2 illustrates selected details of an embodiment of a computer system enabled to use image encoding techniques to encode an image, and enabled to transmit the encoded image. As illustrated in FIG. 2, computer system 100 includes image source 200, image encoder 210, encoder memory 220, and system communications interface 230. Computer system 100 is enabled to perform image encoding, such as progressive image encoding. According to various embodiments, the progressive image encoding includes one or more of: Discrete Cosine Transform (DCT) encoding; wavelet encoding; GREWP encoding as described in U.S. patent application Ser. No. 11/771,797 which is incorporated herein by reference in its entirety; and other progressive image encoding techniques.

Image source 200 is communicatively coupled to image encoder 210 by bus 202. In some embodiments, bus 202 additionally communicatively couples other components of computer system 100. According to various embodiments, image source 200 includes one or more of: a processor capable of generating and/or manipulating images; an interface for receiving compressed and/or uncompressed image data such as a mass storage interface, a camera interface, a network interface, a peripheral interface, or another image-receiving interface; any other source of digital images; and any electronics, including any programmable electronics such as a processor, for converting, processing, selecting, and/or combining any of the foregoing. An exemplary embodiment of image source 200 is illustrated in FIG. 3.

According to various embodiments, bus 202 is one or more of: a DVI bus; a Peripheral Component Interconnect (PCI) bus; a PCI-Express™ bus; a HyperTransport™ bus; an Advanced Microprocessor Bus Architecture (AMBA®) bus; and any other connections, including wired, wireless, and optical connections, for coupling image source 200 and image encoder 210. In some embodiments, bus 202 includes communications elements, such as controllers, data buffers and/or registers, drivers, repeaters, and receivers. In various embodiments, bus 202 includes address, control, and data connections to enable communications among components of computer system 100.

Image encoder 210 performs image encoding operations, such as one or more of image type decomposition, transforming, progressive quantization, image difference calculations for residual encoding, and binary encoding. In some embodiments, image encoder 210 is implemented, at least in part, as a set of computer-executable instructions. According to various embodiments, image encoder 210 includes one or more of: a programmable embedded digital media processor, such as a TMS320DM64x DaVinci™ digital media processor available from Texas Instruments; a PNX1300 Nexperia™ processor from NXP Semiconductors; a Field Programmable Gate Array (FPGA) or an Application Specific Integrated Circuit (ASIC) configured, at least in part, as a logic circuit to perform image encoding; other processors and/or electronic hardware suitable for performing image encoding; and any combination of the foregoing.

Encoder memory 220 stores image information, and optionally stores mask information, related to intermediate encoding steps. In some embodiments, encoder memory 220 is coupled to image encoder 210. In various embodiments, image encoder 210 shares memory resources associated with image source 200. For example, in some embodiments system memory (such as system memory 320 of FIG. 3) and/or drawing memory (such as drawing memory 340 of FIG. 3) share memory resources with encoder memory 220. In various embodiments, encoder memory 220 includes Dynamic Random Access Memory (DRAM), such as synchronous DRAM or video DRAM.

As illustrated in FIG. 2, image encoder 210 is coupled to system communications interface 230 by bus 212. In some embodiments, bus 212 additionally communicatively couples other components of computer system 100. According to various embodiments, bus 212 is one or more of: a Peripheral Component Interconnect (PCI) bus; a PCI-Express™ bus; a HyperTransport™ bus; an Advanced Microprocessor Bus Architecture (AMBA®) bus; and any other connections, including wired, wireless, and optical connections, for coupling image encoder 210 and system communications interface 230. In some embodiments, bus 212 includes communications elements, such as controllers, data buffers and/or registers, drivers, repeaters, and receivers. In some embodiments, bus 212 includes address, control, and data connections to enable communications among components of computer system 100. According to various embodiments, bus 212 is one or more of: independent of bus 202; a same bus as bus 202; a part of bus 202; bridged to bus 202; and communicatively coupled to bus 202.

System communications interface 230 provides communication with an external communication system such as network 110 of FIG. 1 via connection 102. System communications interface 230 sends and receives electrical, electromagnetic, and/or optical signals that carry data, such as digital data streams, representing various types of information. In some embodiments, system communications interface 230 includes a network interface that supports protocol stacks for network communications, such as TCP/IP, and provides network connection 102. In various embodiments, system communications interface 230 is a storage system interface such as one or more of Fibre Channel, Small Computer System Interface (SCSI), Universal Serial Bus (USB), Firewire™, Serial Advanced Technology Attachment (SATA), and other storage system interfaces.

FIG. 3 illustrates selected details of an embodiment of an image source. As illustrated in FIG. 3, image source 200 includes Central Processing Unit (CPU) 300, chipset 310, system memory 320, and Graphics Processing Unit (GPU) 330. Image source 200 provides a source of images, such as to image encoder 210 of FIG. 2.

As illustrated in FIG. 3, Central Processing Unit (CPU) 300 is connected via chipset 310 to system memory 320 and Graphics Processing Unit (GPU) 330. GPU 330 is further connected to drawing memory 340. In some embodiments, system memory 320 and drawing memory 340 are parts of a same, shared memory. In further embodiments, other components of computer system 100, such as image encoder 210, are enabled to use the shared memory. In various embodiments, image source 200 includes other components, such as one or more of: mass storage devices and/or interfaces; network interfaces; and other I/O components and/or interfaces.

According to various embodiments, CPU 300 includes one or more of: a 32-bit CPU; a 64-bit CPU; an AMD CPU, such as an Opteron™ or Athlon™ CPU; an Intel CPU, such as a Xeon™ or Pentium™ or other x86 CPU; a SPARC™ microprocessor, such as those manufactured by Sun Microsystems Inc.; a PowerPC™ microprocessor, such as those manufactured by Motorola or IBM; and any other processor or computing device. In some embodiments, image source 200 includes multiple processors connected by a communications fabric, such as HyperTransport™, InfiniBand™, or RapidIO™.

In some embodiments, system memory 320 stores software and/or data used by CPU 300 and/or by other components of computer system 100. In various embodiments, system memory 320 is globally distributed, such as by including system memory of a plurality of computer systems. According to various embodiments, system memory 320 includes one or more of: electronic, magnetic, optical, and/or other types of storage media; volatile computer-readable media, such as RAM, DRAM, and SRAM; and nonvolatile computer-readable media, such as ROM, hard drive, tape, CDROM, DVDROM, magneto-optical disks, EPROM, EEPROM, Flash EPROM.

In various embodiments, image source 200 includes and/or is coupled to media for storing software and/or data for controlling CPU 300, GPU 330 and/or other components active in sourcing images. According to various embodiments, the software and/or data is stored in and/or on one or more of: mass storage devices; nonvolatile memory; system memory 320; and other computer-readable media. In some embodiments, the software includes one or more separate programs, each of which includes an ordered listing of computer-executable instructions for performing and/or controlling operations of image source 200. According to various embodiments, the software includes one or more of: applications, such as user applications; drivers, such as device drivers; firmware, such as for controlling GPU 330; and operating systems, such as any Windows® operating system from Microsoft, any LINUX® operating system, or any UNIX® operating system, such as those available from Hewlett-Packard or Sun Microsystems, Inc. The operating system controls, at least in part, execution of other portions of the software, and provides services such as scheduling, input-output control, file management, data management, memory management, communication control, and related services.

In some embodiments, GPU 330 operates in association with drawing memory 340 to generate display images on bus 202 using graphics processing techniques. According to various embodiments, GPU 330 include one or more of: a GPU of the Radeon™ family manufactured by ATI/AMD; a GPU of the GeForce™ family manufactured by nVidia; one of the S3 processors from VIA Technologies; and other processors and/or graphics processing units.

In some embodiments, drawing memory 340 is partitioned into a plurality of partitions, such as vertex and frame buffer partitions, and the frame buffer partition is accessible by image encoder 210 of FIG. 2. In other embodiments, GPU 330 and image encoder 210 share system memory 320 with CPU 300, and drawing memory 340 is not present and/or is optionally and/or selectively used. In still other embodiments, neither GPU 330 nor drawing memory 340 are present, and 2D or 3D graphics processing functions, such as DirectX® or OpenGL® processing functions, are integrated with and/or performed by other components, for example in chipset 310 or CPU 300.

In some embodiments, chipset 310 is communicatively coupled with a network interface, such as via a network interface card (NIC). Image encoder 210 (of FIG. 2) is coupled to external systems, such as remote computer system 120 (of FIG. 1) or mass storage systems, using the NIC rather than via system communications interface 230 of FIG. 2. In other embodiments, image encoder 210 is integrated with image source 200, for example as a logic circuit in GPU 330 or chipset 310. In still other embodiments, image encoder 210 is implemented, at least in part, as software, such as one or more programs stored in system memory 320, and the software is executed by CPU 300. In further embodiments where image encoder 210 is implemented, at least in part, as software, system memory 320 is shared between image encoding and other processing functions of CPU 300.

As the various exemplary embodiments above illustrate, many configurations of computer system 100, image source 200, and image source 210 are possible within the scope of the techniques described herein.

FIG. 4 illustrates selected details of an embodiment of a remote computer system enabled to receive an encoded image, and enabled to display a decoded version of the image. As illustrated in FIG. 4, remote computer system 120 includes system communications interface 400, controller 410, image decoder 420, memory 430, display interface 440, and binary decoder 450, all communicatively coupled by bus 402. In some embodiments, remote computer system 120 is implemented, at least in part, as a processor, a computer system, and/or a programming or a processing environment configured to receive and to decode a progressively encoded image stream. According to various embodiments, remote computer system 120 includes one or more of: Human Interface Devices (HIDs); peripheral components, such as microphones or speakers; other interfaces, such as a USB interface; and other components, interfaces, and/or connections associated with computer systems, desktop computers, and/or processors.

In some embodiments, remote computer system 120 is implemented as a stand-alone system, such as a thin client or a desktop computer. In some embodiments, such as some stand-alone embodiments, remote computer system 120 also includes mechanical housing components, connectors, power supplies, and other components not illustrated in FIG. 4. In various embodiments, remote computer system 120 is a processing module integrated in an appliance, such as a phone or a display. In such integrated embodiments, remote computer system 120 is optionally configured to use resources, such as power supply and mechanical support components, provided by the appliance or the display.

According to various embodiments, bus 402 is one or more of: a Peripheral Component Interconnect (PCI) bus; a PCI-Express™ bus; a HyperTransport™ bus; an Advanced Microprocessor Bus Architecture (AMBA®) bus; and any other connections, including wired, wireless, and optical connections, for coupling components of remote computer system 120. In some embodiments, bus 402 includes communications elements, such as controllers, data buffers and/or registers, drivers, repeaters, and receivers. In various embodiments, bus 402 includes address, control, and data connections to enable communications among components of remote computer system 120. According to various embodiments, bus 402 is one or more of: a single bus; a plurality of independent busses, with some of the components of remote computer system 120 coupled to more than one of the independent busses; a plurality of bridged busses; a fabric, such as HyperTransport™, InfiniBand™, or RapidIO™; and any other one or more busses configured to couple the components of remote computer system 120.

In some embodiments, system communications interface 400 includes a network interface that provides communicative coupling between remote computer system 120 and network 110 of FIG. 1 via connection 112. System communications interface 400 sends and receives electrical, electromagnetic, and/or optical signals that carry data, such as digital data streams, representing various types of information. In some embodiments, system communications interface 400 includes a network interface that supports protocol stacks for network communications, such as TCP/IP, and provides network connection 112. In various embodiments, system communications interface 400 is a storage system interface such as one or more of Fibre Channel, Small Computer System Interface (SCSI), Universal Serial Bus (USB), Firewire™, Serial Advanced Technology Attachment (SATA), and other storage system interfaces.

Controller 410 provides control and/or management functions for remote computer system 120. According to various embodiments, controller 410 includes one or more of: a microcontroller, such as those manufactured by Microchip; a 32-bit CPU; a 64-bit CPU; an AMD CPU, such as an Opteron™ or Athlon™ CPU; an Intel CPU, such as a Xeon™ or Pentium™ or other x86 CPU; a SPARC™ microprocessor, such as those manufactured by Sun Microsystems Inc.; a PowerPC™ microprocessor, such as those manufactured by Motorola or IBM; and any other processor or computing device. In some embodiments, such as embodiments where remote computer system 120 includes an ASIC or an FPGA, controller 410 includes a processor embedded in the ASIC or the FPGA, such as a MIPS, an ARM, or another type of embedded processor.

According to various embodiments, controller 410 initializes one or more of: bus 402, system communications interface 400, image decoder 420, memory 430, display interface 440, binary decoder 450, and other components of remote computer system 120. In some embodiments, controller 410 establishes a management connection with computer system 100 of FIG. 1 to enable communication of management information, such as image build state, status updates and error reports. For example, in some embodiments, system communications interface 400 provides, at least in part, a first network connection (such as a TCP/IP socket) for receiving image data, and a second network connection for the management connection. In some embodiments, the image build state is sent along with the image data on the first network connection. In other embodiments, the image build state is sent, at least in part, on the management connection.

Image decoder 420 performs image decoding. In some embodiments, image decoder 420 performs progressive image decoding, including operations such as image transformation, quantization, and inverse image transformation. In further embodiments, image decoder 420 is implemented, at least in part, as a set of computer-executable instructions. According to various embodiments, image decoder 420 includes one or more of: a programmable embedded digital media processor, such as a TMS320D64x DaVinci™ digital media processor available from Texas Instruments; a PNX1300 Nexperia™ processor from NXP Semiconductors; a Field Programmable Gate Array (FPGA) or an Application Specific Integrated Circuit (ASIC) configured, at least in part, as a logic circuit to perform image decoding; and other processors and/or electronic hardware suitable for performing image decoding; software executing on and/or in conjunction with a processor, including any of the foregoing; and any combination of the foregoing.

In some embodiments where remote computer system 120 includes a processor (such as a CPU, a microprocessor, a microcontroller, or a programmable media processor), resources of the processor are used, at least in part, to implement one or more functions of components of remote computer system 120, such as functions of system communications interface 400, image decoder 420, display interface 440, and binary decoder 450.

According to various embodiments, memory 430 includes one or more of: electronic, magnetic, optical, and/or other types of storage media; volatile computer-readable media, such as RAM, DRAM, and SRAM; and nonvolatile computer-readable media, such as ROM, hard drive, tape, CDROM, DVDROM, magneto-optical disks, EPROM, EEPROM, Flash EPROM.

In various embodiments, memory 430 stores information such as received image information, decoded image information, decoded raster image information in a format accessible to display interface 440, and information associated with controller 410, such as software and/or data used by controller 410. In further embodiments, memory 430 includes a type of ROM or other non-volatile media used to store software, such as programs or firmware, executed by controller 410. In various embodiments, memory 430 is partitioned and/or distributed. For example, in some embodiments, memory 430 is partitioned into a plurality of partitions, such as system and frame buffer partitions, and the frame buffer partition is accessible by display interface 440. In various embodiments, memory 430 uses different busses for coupling with system communications interface 400, controller 410, image decoder 420, interface 440, and/or other components of remote computer system 120. In further embodiments, memory 430 includes control logic for arbitrating access to memory 430 among the components of remote computer system 120.

Display interface 440 accesses display information, such as decoded raster image information, from memory 430, and provides a display signal, such as a raster signal, on connection 122. In some embodiments where connection 122 is a DVI connection, display interface 440 includes line driver circuitry such as Transition-Minimized Differential Signaling (TMDS) ciruitry. In some embodiments where connection 122 is a VGA connection, display interface 440 includes a VGA controller.

In some embodiments, remote computer system 120 includes binary decoder 450. According to various embodiments, binary decoder 450 performs one or more of: entropy arithmetic decoding; and a lossless data decompression technique. In further embodiments, the operation of binary decoder 450 is complementary to binary encoding performed by image encoder 210 of FIG. 2. According to various embodiments, binary decoder 450 is implemented as one or more of: a logic circuit; software executed on a processor; and any combination of the foregoing. In some embodiments where binary decoder 450 is implemented, at least in part, in software, at least some functions of binary decoder 450 are executed as a set of instructions by controller 410 or a processor of remote computer system 120. In some embodiments where binary decoder 450 is implemented, at least in part, as a logic circuit, binary decoder 450 is physically co-located with image decoder 420, such as by being on a same integrated circuit as image decoder 420.

Decoder

Figure 5A:
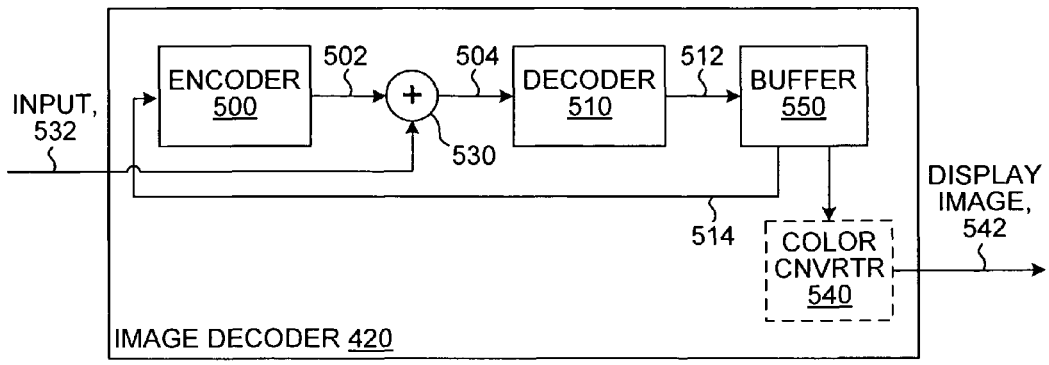
FIGS. 5A and 5B illustrate selected details of embodiments of image decoders.
Figure 5B:
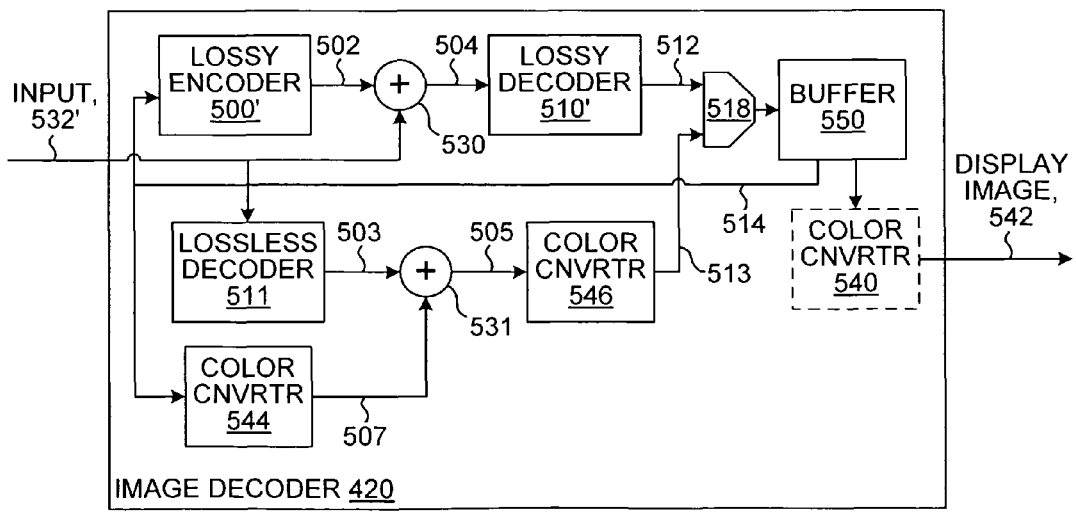

FIGS. 5A and 5B illustrate selected details of embodiments of image decoders. As illustrated in FIG. 5A, a first exemplary embodiment of image decoder 420 includes encoder 500, decoder 510, combiner 530, buffer 550, and optionally color converter 540. As illustrated in FIG. 5B, a second exemplary embodiment of image decoder 420 includes lossy encoder 500', lossy decoder 510', combiner 530, buffer 550, multiplexer 518, color converters 544 and 546, lossless decoder 511, and optionally color converter 540. The exemplary embodiments of FIGS. 5A and 5B are similar, with the exemplary embodiment of FIG. 5B providing modified and additional functionality as compared to the exemplary embodiment of FIG. 5A.

Lossy encoder 500' of FIG. 5B provides a substantially similar function to that of encoder 500 of FIG. 5A, and lossy decoder 510' of FIG. 5B provides a substantially similar function to that of decoder 510 of FIG. 5A. According to various embodiments, any of the encoders and/or decoders of FIGS. 5A and 5B can be lossy or lossless. The encoder and decoder of FIG. 5B are termed "lossy" to highlight the additional functionality of FIG. 5B, which processes residually encoded updates. Similarly, the distinction between input 532 of FIG. 5A and input 532' of FIG. 5B is to indicate that input 532' contains information related to the additional functionality of FIG. 5B. Unless otherwise stated, components which are in common between FIGS. 5A and 5B, including lossy encoder 500' and encoder 500, including lossy decoder 510' and decoder 510, and including input 532 and input 532', operate in a similar fashion and descriptions of the common components herein apply to both FIGS. 5A and 5B.

In some embodiments, image decoder 420 is initialized by setting locations in buffer 550 that store display image 542 to initial default image values, and/or by initializing one or more of the components of image decoder 420, such as by initializing encoder 500 and/or decoder 510.

In some embodiments and/or usage scenarios, input 532 includes transformed image coefficients associated with a progressively encoded image, such as a series of progressively encoded updates of the image. According to various embodiments, the transformed image coefficients include one or more of: DCT coefficients; wavelet coefficients; GREWP coefficients; and any other coefficients used for image encoding. In further embodiments and/or usage scenarios, input 532 includes residually-encoded updates of the image.

In some embodiments, input 532 includes a series of progressively encoded updates of an image. In further embodiments, a respective build state is associated with each of the progressively encoded updates. According to various embodiments, the respective build states are one or more of: provided by a computer system, such as computer system 100 of FIG. 1; and transmitted via input 532 along with the associated progressively encoded updates. In some embodiments and/or usage scenarios, an initial one of the respective build states is associated with an initial one of the progressively encoded updates.

In some embodiments, when input 532 includes a non-initial one of the progressively encoded updates, a corresponding previously-built image is provided from buffer 550 via connection 514. In various embodiments where a current one of the respective build states is associated with the non-initial progressively encoded update, a prior one of the respective build states is associated with the previously-built image.

In some embodiments, the previously-built image is encoded by encoder 500 to produce re-encoded coefficient data 502, transforming the previously-built image to a same encoded format as that of the non-initial progressively encoded update. Re-encoded coefficient data 502 is then combined with the non-initial progressively encoded update by combiner 530 to produce combined data 504. According to various embodiments, combiner 530 combines re-encoded coefficient data 502 with the non-initial progressively encoded update by one or more of: adding; subtracting; merging; shifting and/or masking; logical operations such as ORing or XORing; and any combination of the foregoing. Combined data 504 is then decoded by decoder 510 to produce decoded data 512, which is then stored in buffer 550. (As illustrated in FIG. 5B, the storing is via multiplexer 518.)

In some embodiments, decoder 510 supports decoding that is complementary to that of an encoder, such as image encoder 210 of FIG. 2. In various embodiments and/or usage scenarios, decoded data 512 is an updated version of the previously-built image with increased accuracy due to the inclusion of the non-initial progressively encoded update. In further embodiments, the current respective build state is associated with the updated version of the previously-built image. According to various embodiments and/or usage scenarios, one or more of: the updated version of the previously-built image replaces the previously-built image in buffer 550; the updated version of the previously-built image is written to a different location in buffer 550 than a location of the previously-built image; output to a display switches from the previously-built image to the updated version of the previously-built image; and the previously-built image is discarded (freeing the location of the previously-built image for other uses).

In various embodiments, encoder 500 quantizes re-encoded coefficient data 502 according to the one of the respective build states associated with the previously-built image. In other embodiments, encoder 500 quantizes re-encoded coefficient data 502 according to the one of the respective build states associated with the non-initial progressively encoded update. In some embodiments, encoder 500 produces same, or substantially the same, coefficient data (on re-encoded coefficient data 502) as would be produced by combining the series of progressively encoded updates from an initial one of the progressively encoded updates through the one of the progressively encoded updates last combined with the previously-built image. By re-encoding the previously-built image, the transformed coefficients of the progressively encoded updates are discardable once the transformed coefficients of the progressively encoded updates are used, and the previously-built image is retained in solely a single format.

In some embodiments, when input 532 includes an initial one of the progressively encoded updates, the initial progressively encoded update is decoded by decoder 510 to produce decoded data 512, which is then stored in buffer 550 as an initial version of the previously-built image. In further embodiments, the initial progressively encoded update is provided to decoder 510 via a multiplexer (not illustrated in FIG. 5A or 5B). In other embodiments, the initial progressively encoded update is provided to decoder 510 via forcing the output of combiner 530 to be equal to the initial progressively encoded update. According to various embodiments, the forcing the output of combiner 530 to be equal to the initial progressively encoded update includes one or more of: disabling the combining of combiner 530 so that combiner 530 passes through the initial progressively encoded update; forcing re-encoded coefficient data 502 to be zero; and setting a quantization threshold of encoder 500 so that output of encoder 500 is zero. In further embodiments, the quantization threshold of encoder 500 is set so that the output of encoder 500 is zero in response to the respective build state associated with the initial progressively encoded update indicating an initial build state.

In some embodiments, an image stored in buffer 550 is output from buffer 550 to a display as display image 542 without color space conversion (and color space converter 540 is not required and/or is not used). In other embodiments, color space converter 540 converts a color format of the image prior to output to the display. For example, the image is stored in a 30-bit YUV color format, and color space converter 540 converts the image to a 24-bit RGB color format for output to the display. According to various embodiments, color space converter 540 is one or more of: reversible; irreversible; lossy; and lossless.

In some embodiments, such as various embodiments using YUV or similar color formats for image encoding, decoder 510, subsequent to decoding, optionally and/or selectively performs a reversible color space conversion to produce decoded data 512, and encoder 500, prior to encoding, correspondingly performs an inverse of the reversible color space conversion. Performing a reversible color space conversion prior to storing decoded data 512 in buffer 550 enables, in some embodiments and/or usage scenarios, direct output from buffer 550 to a display without a need for further color conversion (and color space converter 540 is not required and/or is not used).

In various embodiments, image decoder 420 is not restricted to processing a single image in a single format at a time. For example, in some embodiments, each image update (whether progressively encoded or residually encoded) arriving on input 532 of FIG. 5A (or input 532' of FIG. 5B) includes information enabling remote computer system 120 of FIG. 4 and/or image decoder 420 to identify one of a plurality of images in buffer 550 to be updated by the update. Accordingly, updates of multiple images stored in buffer 550, including initial updates for images to be stored in buffer 550 and progressively and/or residually encoded updates of images already stored in buffer 550, optionally and/or selectively arrive in an interleaved fashion.

The exemplary embodiment of FIG. 5B includes additional functionality as compared to the exemplary embodiment of FIG. 5A. Multiplexer 518 is used to select one of a plurality of paths for storing an updated version of an image in buffer 550. When processing a progressively encoded update, an updated version of a previously-built image on decoded data 512 is stored in buffer 550. When processing a residually encoded update, an updated version of a previously-built image on combined data 513 is stored in buffer 550. According to various embodiments, selection of the path for storing is determined by one or more of: a respective build state associated with the progressively encoded update or the residually encoded update; a format or a header of information associated with the progressively encoded update or the residually encoded update as provided on input 532'; a processor, such as a processor of controller 410 of FIG. 4; and other control and/or signaling techniques.

In some embodiments, residual encoding improves the quality of a previously-built image by transmitting a residually-encoded update providing increased accuracy, followed by a residual transform step. In further embodiments, a plurality of residually-encoded updates to an image are sent to track changes to the image, such for some video images. In various embodiments, the residual transform step is used after the previously-built image has reached a predetermined quality threshold, such as a perceptually lossless quality threshold. In further embodiments, the predetermined quality threshold is according to a predetermined one of a plurality of build states. In some embodiments and/or usage scenarios, a residually-encoded update increases quality of the previously-built image to a numerically lossless level using less bandwidth than would incrementally increasing accuracy of transform coefficients via further progressively encoded updates.

In some embodiments, the residually encoded image is calculated by subtracting RGB values of a partially-built reference image at an image-sourcing computer system, such as computer system 100 of FIG. 1, from RGB values of the related input (lossless) image, producing residual RGB values. The result of the subtraction is encoded using binary encoding techniques, and is then transmitted or stored for processing by an image decoder, such as image decoder 420 of FIG. 4. Image decoder 420 then calculates a lossless image by adding the received residual RGB values to RGB values associated with a current previously-built image. In this final stage of a progressive build, a temporal domain and/or a color format associated with the residually encoded updates, such as a wavelet encoded domain or a YUV or similar color format, is bypassed by excluding wavelet or other decoding, scaling, quantization, and optional color space conversion functions.

In some embodiments of image decoder 420, such as the exemplary embodiment of FIG. 5B, input 532' is configured to provide a residually encoded update of a previously-built image stored in buffer 550. The residually encoded update is received in a encoded format, such as a DCT-encoded format or a binary-encoded format, and is decoded by lossless decoder 511, producing decoded residually encoded update 503.

In response to receiving the residually encoded update, a corresponding previously-built image is provided from buffer 550 via connection 514 and is optionally and/or selectively color space converted by color space converter 544, producing converted previously-built image 507 in a same color format as the decoded residually encoded update. Converted previously-built image 507 is then combined, via combiner 531, with decoded residually encoded update 503 to produced combined converted data 505. According to various embodiments, combiner 531 combines converted previously-built image 507 with decoded residually encoded update 503 by one or more of: adding; subtracting; merging; shifting and/or masking; logical operations such as ORing or XORing; and any combination of the foregoing. Combined converted data 505 is then optionally and/or selectively color space converted by color space converter 546 to be in a same color format as the previously-built image, producing combined data 513. Combined data 513 is then stored in buffer 550 (via multiplexer 518) as an updated version of the previously-built image.

Figure 6:
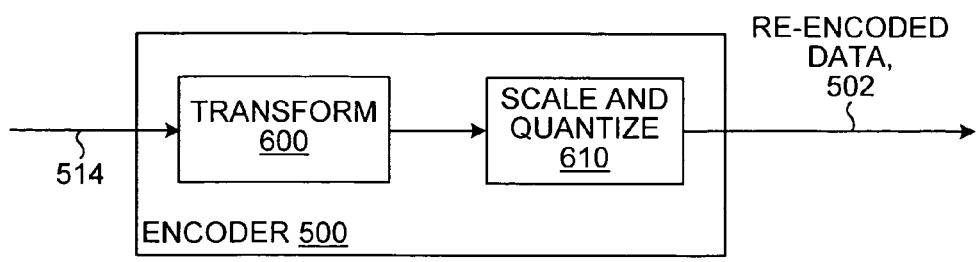
FIG. 6 illustrates selected details of an embodiment of an image encoding block.

FIG. 6 illustrates selected details of an embodiment of an image encoding block. As illustrated in FIG. 6, encoder 500 includes transform module 600 coupled to scale and quantize module 610. In various embodiments, encoder 500 is substantially similar to and/or operates substantially similar to image encoder 210 of FIG. 2.

In some embodiments, transform module 600 receives a previously-built image via connection 514 and executes a two dimensional image wavelet transform having an output coefficient format substantially similar to a coefficient format produced by an original encoder elsewhere in the system (such as image encoder 210 of FIG. 2). According to various embodiments, the wavelet transform is compatible with one or more of: JPEG2000, GREWP encoding as described in U.S. patent application Ser. No. 11/771,797; and any similar progressive wavelet encoding technique. In other embodiments, transform module 600 uses other transform techniques, such as progressive Discrete Cosine Transform (DCT) encoding, and similar progressive encoding techniques.

The image coefficients output from transform module 600 are forwarded to scale and quantize module 610, which scales and quantizes the previously-built image according to a build state. According to various embodiments, the build state is one or more of: associated with the previously-built image; and associated with an update received by image decoder 420 of FIG. 5A or 5B.

In some embodiments, scale and quantize module 610 quantizes the image by dividing coefficient magnitudes by a quantization factor and rounding the result, such as by rounding down. In further embodiments and/or usage scenarios where the build state is an initial build state for a new image, the quantization factor is set such that output coefficients from scale and quantize module 610 are zero.

Figure 7:
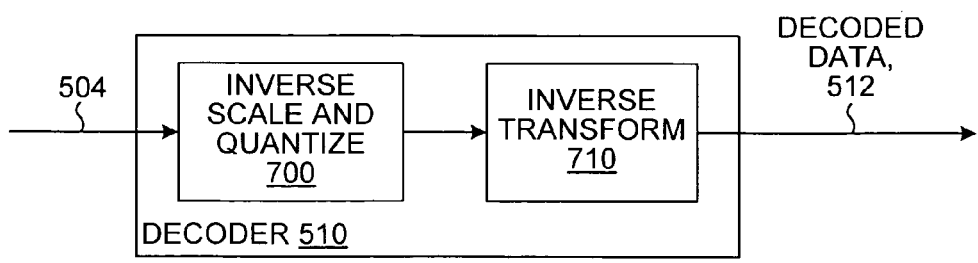
FIG. 7 illustrates selected details of an embodiment of an image decoding block.

FIG. 7 illustrates selected details of an embodiment of an image decoding block. As illustrated in FIG. 7, decoder 510 includes inverse scale and quantize module 700 coupled to inverse transform module 710.

Combined data 504, providing a combined image, is provided to inverse scale and quantize module 700. In some embodiments, a quantization level of inverse scale and quantize module 700 is set according to a respective build state associated with an update received by image decoder 420 of FIG. 5A or 5B. The combined image is inverse scaled and quantized to the quantization level, and the inverse scaled and quantized combined image is then provided to inverse transform module 710. Inverse transform module 710 applies an inverse transform complementary to that of a forward transform used by encoder 500 of FIG. 6, producing decoded data 512.

Figure 8A:
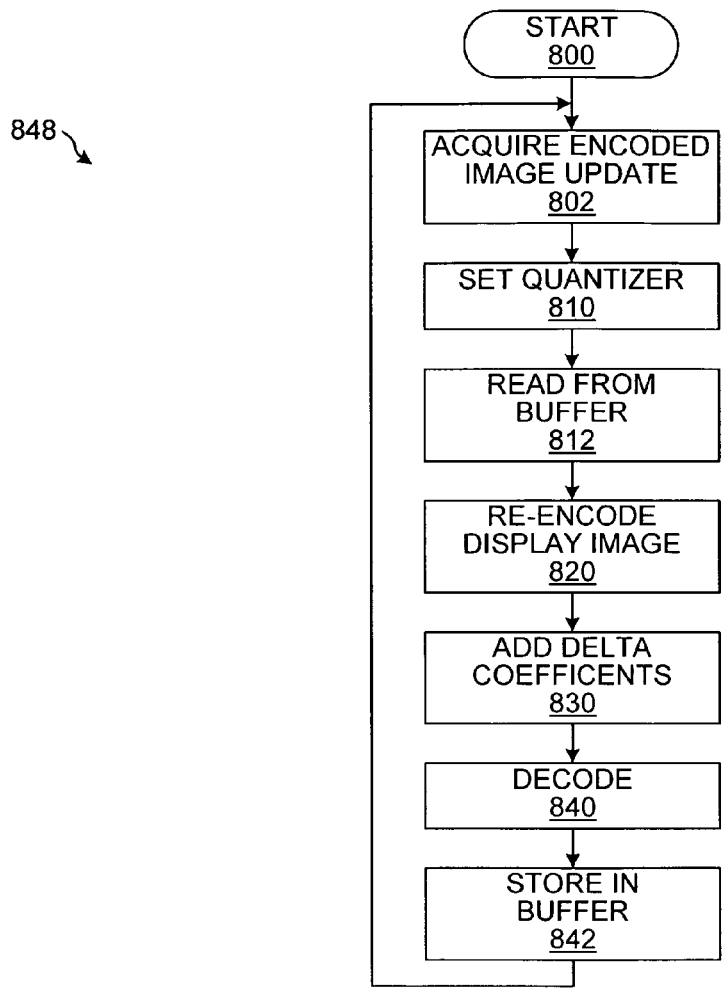
FIG. 8A illustrates an embodiment of a process for progressive image decoding.

FIG. 8A illustrates an embodiment of a process for progressive image decoding. Process 848 starts ("Start 800") and acquires one of a series of encoded image updates ("Acquire Encoded Image Update" 802) of a particular image. For example, in some embodiments, the encoded image update is provided over an input, such as connection 112 of FIG. 4, and is then stored in a memory, such as memory 430 of FIG. 4. Continuing the example, in further embodiments the encoded image update is subsequently read from memory 430 and is provided, such as via input 532 of FIG. 5A, to an image decoder, such as image decoder 420 of FIG. 5A. In some embodiments and/or usage scenarios, entropy decoding techniques are applied to the received encoded image update.

Next, a quantization level of an encoder (such as encoder 500 of FIG. 5A) is set according to a build state associated with the encoded image update ("Set Quantizer" 810). In some embodiments, if the build state is an initial build state, the quantization level is set such that the output coefficients of the encoder are zero. In some embodiments, if the build state is not an initial build state, the quantization level is set to correspond to that of a previously-built image to which the encoded image update is applied.

Then, in some embodiments, if the build state is not an initial build state, the previously-built image is read from a buffer, such as buffer 550 of FIG. 5A ("Read From Buffer" 812), and the previously-built image is re-encoded ("Re-encode Display Image" 820), such as by encoder 500 of FIG. 5A. In some embodiments, the previously-built image is selectively processed using an inverse reversible color space conversion prior to the re-encoding. According to various embodiments, the re-encoding uses one or more of: wavelet encoding; Discrete Cosine Transform (DCT) encoding; and any other progressive image encoding technique.

Next, the encoded image update is combined with the re-encoded, previously-built image ("Add Delta Coefficients" 830), such as by combiner 530 of FIG. 5A. Then, the combined, re-encoded, previously-built image is decoded ("Decode" 840). According to various embodiments, the decoding uses one or more of: wavelet decoding; Discrete Cosine Transform (DCT) decoding; and any other image decoding technique. In some embodiments, the decoded image is quantized to a level corresponding to the build state associated with the encoded image update. In various embodiments, the decoded image is selectively processed using a reversible color space conversion.

Then, the decoded image is stored in a buffer, such as buffer 550 of FIG. 5A ("Store in Buffer" 842) as an updated version of the previously-built image.

In some embodiments, process 848 iterates to process subsequent encoded image updates by returning to acquire a (subsequent) encoded image update ("Acquire Encoded Image Update" 802). The process terminates (not illustrated in FIG. 8A), after processing a last one of the series of encoded image updates of the particular image. Subsequent to processing the last one of the series of encoded image updates, the previously built image is further updated, in some embodiments and/or usage scenarios, by a residually encoded update of the particular image.

While process 848 is described above with respect to a particular image, process 848 is applicable to a series of images, such as a series of images of a video steam, for example by applying the process to each image of the series of images.

Figure 8B:
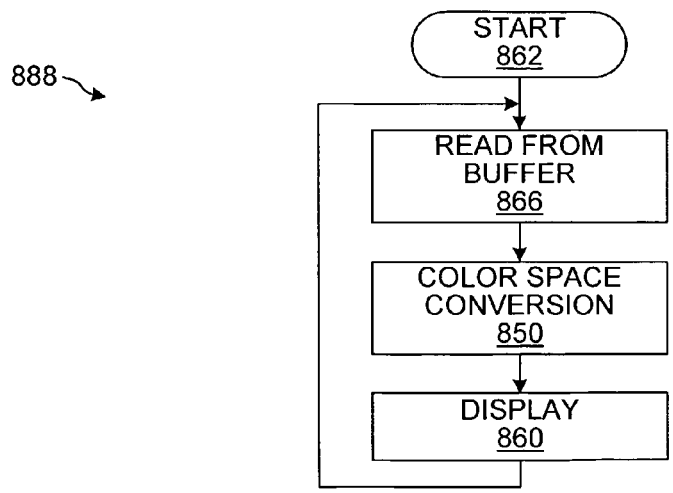
FIG. 8B illustrates an embodiment of a process for sending display data to a display.

FIG. 8B illustrates an embodiment of a process for sending display data to a display. Process 888 starts ("Start 862") and reads a previously-built image from a buffer, such as buffer 550 of FIG. 5A ("Read From Buffer" 866). In some embodiments, the previously-built image is optionally and/or selectively processed by color space conversion ("Color Space Conversion" 850). The optionally and/or selectively color space converted previously-built image is then output to a display, such as display 130 of FIG. 1 ("Display" 860).

In some embodiments, process 848 operates independent of process 888, and process 848 optionally updates a previously-built image that process 888 is displaying. In other embodiments, higher-level synchronization, such as provided by a processor of remote computer system 120 of FIG. 4, prevents process 848 from updating a previously-built image that process 888 is currently displaying. For example, in some embodiments, an updated version of a previously-built image is stored in a different location in a buffer than a location storing the previous version. Process 888 processes images to be output using a display list, and the display list is solely updated to refer to an updated version of a previously-built image after the updating is complete.

In some embodiments, process 888 does not terminate (as long as the display is enabled). In other embodiments, the process is controlled by power-saving and/or other techniques.

Color Space Conversion

In some embodiments, a use of a reversible color space transform enables lossless conversions between different color spaces. For example, in various embodiments similar to those illustrated in FIG. 5, decoder 510 performs a color space conversion subsequent to decoding an image and prior to storing the image in buffer 550, and encoder 500 performs an inverse color space conversion prior to encoding the image read from buffer 550. Provided that the color space conversion is reversible, encoder 500 is enabled to operate on same data as previously produced by decoder 510 (prior to the color space conversion).

In some embodiments, decoded image data is converted between a 3×8-bit RGB color format and a 3×10-bit YUV color format using conversion techniques similar to the Irreversible Color Transform (ICT) used in image compression standards, but modified to be reversible. An exemplary set of formulae enabling reversible conversion from the YUV color format to the RGB color format is as follows:

$$Y' = Y + 510$$

$$B = \text{Round}\left[\frac{64Y' + InvUWeight \times U}{256}\right]$$

$$R = \text{Round}\left[\frac{64Y' + InvVWeight \times V}{256}\right]$$

$$G = \text{Round}\left\{55\left[Y' - \text{Round}\left[\frac{77R + 30B}{64}\right]\right] \div 128\right\}$$

In some embodiments, the resulting RGB components are each restricted to a range 0 to 255, such as by forcing values out of the range to a nearest one of 0 or 255. In some usage scenarios, UV chrominance values are restricted to the range ±255 to minimize a risk of R image pixel values saturating when progressive builds are performed at low quality levels where errors resulting from quantization operations are at their highest. In various embodiments, the values for the transform weights are:
  InvUWeight: 226 (E2 hex)
  InvVWeight: 179 (B3 hex)

An exemplary set of conversion formulae enabling reversible conversion from the RGB color format to the YUV color format is as follows:

$$Y' = \text{Round}\left[\frac{149G}{64}\right] + \text{Round}\left[\frac{77R + 30B}{64}\right]$$

$$Y = Y' - 510$$

$$U = \text{Round}\left[\frac{FwdUWeight(4B - Y')}{512}\right]$$

$$V = \text{Round}\left[\frac{FwdVWeight(4R - Y')}{512}\right]$$

In various embodiments, the values for the transform weights are:
  FwdUWeight: 145 (91 hex)
  FwdVWeight: 183 (B7 hex)

In other embodiments, other values for InvUWeight, InvVWeight, FwdUWeight and FwdVWeight are used. An exemplary list of values in the range 0 to 255 is provided in the following table. For each pair of values, the resulting range of chrominance values is also given.

| FwdUWeight | InvUWeight | U range | FwdVWeight | InvVWeight | V range |
|---|---|---|---|---|---|
| 145 | 226 | −255 +255 | 145 | 226 | −202 +202 |
| 163 | 201 | −287 +287 | 159 | 206 | −222 +221 |
| 182 | 180 | −320 +320 | 180 | 182 | −251 +251 |
| 201 | 163 | −354 +353 | 185 | 177 | −258 +258 |
| 220 | 149 | −387 +387 | 205 | 160 | −286 +285 |
| 239 | 137 | −421 +420 | 220 | 149 | −307 +306 |
| 252 | 130 | −443 +443 | 231 | 142 | −322 +322 |
| 254 | 129 | −447 +446 | 234 | 140 | −326 +326 |
|  |  |  | 236 | 139 | −329 +329 |
|  |  |  | 248 | 132 | −346 +345 |
|  |  |  | 254 | 129 | −354 +354 |

Example Hardware Emobodiment Techniques

In some embodiments, various combinations of all or portions of functions performed by a computer system (such as computer system 100 of FIG. 1 or 2), a remote computer system (such as remote computer system 120 of FIG. 1 or 4), an image decoder (such as image decoder 420 of FIG. 4, 5A, or 5B), an encoder (such as encoder 500 of FIG. 6), a decoder (such as decoder 510 of FIG. 7), and portions of a processor, a microprocessor, or a programmable controller providing all or portions of the aforementioned functions, are specified by descriptions compatible with processing by a computer system (e.g. Verilog, VHDL, or any similar hardware description language). In various embodiments the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as a capacity, width, bandwidth, or number of pixels; a type and/or a precision of an image encoding format; a type and/or a precision of an image color format; a physical packaging, arrangement or organization of integrated circuit chips; a physical packaging, arrangement or organization of components of a decoder; a nature, type, capacity, or performance of processors; a bandwidth, type, or protocol of any communications link, connection, or coupling; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communications links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design include insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
   receiving a first set of bit-planes of a frequency domain transformation of a source image;
   decoding, by a computer, the first set to produce a first image;
   discarding the first set;
   receiving, subsequent to discarding the first set, a second set of bit planes of the frequency domain transformation;
   re-encoding the first image, by an inverse operation of the decoding the first set, to produce an exact copy of the first set;
   combining the exact copy of the first set with the second set to produce a first combined set of bit-planes; and
   decoding, by the computer, the first combined set of bit-planes to produce a second image.

2. The method of claim 1, further comprising displaying the first image prior to receiving the second set and displaying the second image subsequent to decoding the first combined set, wherein the second image is a more accurate reproduction of the source image than the first image.

3. The method of claim 1 wherein the exact copy of the first set has identical data values to the first set and decoding the first combined set requires the exact copy of the first set to comprise the identical data values to the first set.

4. The method of claim 1 further comprising discarding the exact copy of the first set and the second set prior to (i) receiving a third set of bit-planes of the frequency domain transformation, (ii) re-encoding the second image to produce an exact copy of the first combined set, (iii) combining the exact copy of the first combined set with the third set to produce a second combined set of bit-planes, and (iv) decoding the second combined set to produce a third image that is a more accurate reproduction of the source image than the second image.

5. The method of claim 1 further comprising (i) receiving a residual encoding of the source image and decoding a combination of the second image and the residual encoding to generate a lossless reproduction of the source image.

6. The method of claim 1, wherein (i) decoding the first set comprises transforming the first set from a frequency domain to a spatial domain, (ii) decoding the first combined set comprises transforming the first combined set from the frequency domain to the spatial domain and (iii) re-encoding the first image comprises transforming the first image from the spatial domain to the frequency domain.

7. The method of claim 1, wherein discarding the first set comprises freeing a memory location where the first set was stored.

8. The method of claim 1, wherein the first set is an encoding of a first portion of a plurality of portions of the source image and decoding the first set comprises saving a first build state of the first portion, wherein the first build state is required for re-encoding the first image.

9. The method of claim 8, further comprising (a) decoding an encoding of each portion of the plurality of portions to generate (i) a decoded image comprising the first image and (ii) a plurality of build states comprising the first build state, and (b) displaying the decoded image.

10. The method of claim 9, wherein each build state of the plurality of build states comprises a bit-plane quantization level of an associated portion of the decoded image.

11. The method of claim 1, further comprising eliminating a requirement to store and retrieve the first set by encoding the first image to regenerate exact values of the first set.

12. The method of claim 1, wherein (i) decoding the first set comprises a transformation from a frequency domain to a spatial domain, (ii) re-encoding the first image comprises an inverse of the transformation, and (iii) the transformation, the inverse of the transformation and storing the first image are of sufficient precision to regenerate, independent of content of the source image, exact values of the first set.

13. The method of claim 1, further comprising repeatedly (i) receiving subsequent sets of the bit planes, (ii) re-encoding images produced by previous decodings of subsequent combinations of received sets of the bit planes, and (iii) decoding combined sets of the bit planes, as part of a progressive build decoding of the source image.

14. The method of claim 13, further comprising discontinuing the progressive build decoding at a specified quality level and combining a decoding of a residual encoding of the source image with the first image to generate a lossless reproduction of the source image, the residual encoding encoded in a spatial domain.

15. The method of claim 14 wherein the first image is stored in a first color space and the decoding of the residual encoding is stored in a second color space, and wherein combining the decoding of the residual encoding with the first image comprises converting the first image to the second color space.

16. The method of claim 1, wherein combining the exact copy of the first set with the second set is performed in a frequency domain and decoding the first combined set comprises a transformation from the frequency domain to a spatial domain.

17. A computer-readable medium having a set of instructions stored therein which when executed by a processing device causes the processing device to perform procedures comprising:
decoding a first set of bit-planes of a frequency domain transformation of a source image to produce a first image;
discarding the first set;
re-encoding the first image, by an inverse operation of the decoding the first set, to produce an exact copy of the first set;
combining the exact copy of the first set with a second set of bit planes of the frequency domain transformation to produce a first combined set of bit-planes, wherein the second set is received subsequent to discarding the first set; and
decoding the first combined set of bit-planes to produce a second image.

18. The computer-readable medium of claim 17, wherein the procedures further comprise displaying the first image prior to receiving the second set and displaying the second image subsequent to decoding the first combined set, wherein the second image is a more accurate reproduction of the source image than the first image, and wherein combining the exact copy of the first set with the second set is performed in a frequency domain and decoding the first combined set comprises a transformation from the frequency domain to a spatial domain.

19. The computer-readable medium of claim 17, wherein the computer-readable medium is enabled to be executed by the processing device, the processing device comprising a hardware encoder, the hardware encoder configured to perform, at least in part, the re-encoding.

20. An image decoder comprising:
decoding circuitry for decoding a first set of bit-planes of a frequency domain transformation of a source image to produce a first image;
frequency domain encoding circuitry for re-encoding the first image, by an inverse operation of the decoding the first set, to produce an exact copy of the first set, wherein the first set is discarded prior to re-encoding the first image; and
combining circuitry for combining the exact copy of the first set with a second set of bit planes of the frequency domain transformation to produce a first combined set of bit-planes, wherein the second set is received subsequent to the first set being discarded;
wherein the decoding circuitry further decodes the first combined set to produce a second image.

21. The image decoder of claim 20, wherein the first image is displayed prior to receiving the second set and the second image is displayed subsequent to decoding the first combined set, wherein the second image is a more accurate reproduction of the source image than the first image, and wherein combining the exact copy of the first set with the second set is performed in a frequency domain and decoding the first combined set comprises a transformation from the frequency domain to a spatial domain.

22. A progressive image decoder comprising:
means for decoding a first set of bit-planes of a frequency domain transformation of a source image to produce a first image;
means for receiving a second set of bit planes of the frequency domain transformation;

means for re-encoding the first image, by an inverse operation of the decoding the first set, to produce an exact copy of the first set, wherein the first set is discarded prior to re-encoding the first image; and means for combining the exact copy of the first set with a second set of bit planes of the frequency domain transformation to produce a first combined set of bit-planes, wherein the second set is received subsequent to the first set being discarded, and wherein the means for decoding further decodes the first combined set to produce a second image.

23. The progressive image decoder of claim 22, wherein the first image is displayed prior to receiving the second set and the second image is displayed subsequent to decoding the first combined set, wherein the second image is a more accurate reproduction of the source image than the first image, and wherein combining the exact copy of the first set with the second set is performed in a frequency domain and decoding the first combined set comprises a transformation from the frequency domain to a spatial domain.

* * * * *